US007309368B2

(12) United States Patent
Oh et al.

(10) Patent No.: US 7,309,368 B2
(45) Date of Patent: Dec. 18, 2007

(54) CYCLONE DUST-COLLECTING APPARATUS

(75) Inventors: Jang-keun Oh, Gwangju (KR); Il-du Jung, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 426 days.

(21) Appl. No.: 11/025,407

(22) Filed: Dec. 29, 2004

(65) Prior Publication Data

US 2005/0172586 A1 Aug. 11, 2005

(30) Foreign Application Priority Data

Feb. 11, 2004 (KR) ...................... 10-2004-0009088
Nov. 3, 2004 (KR) ...................... 10-2004-0088845

(51) Int. Cl.
*B01D 45/12* (2006.01)

(52) U.S. Cl. ............................ 55/343; 55/349; 55/429; 55/459.1

(58) Field of Classification Search .................. 55/343, 55/346, 349, 416, 429, 459.1, DIG. 3
See application file for complete search history.

(56) References Cited

U.S. PATENT DOCUMENTS 2,143,144 A 10/1939 Fagerberg
3,425,192 A 2/1969 Davis
D484,286 S 12/2003 Dyson et al.
6,679,930 B1* 1/2004 An et al. ...................... 55/337
7,128,770 B2* 10/2006 Oh et al. ...................... 55/343
2005/0050678 A1* 3/2005 Oh et al. ...................... 15/353
2005/0251951 A1* 11/2005 Oh et al. ...................... 15/353
2006/0107629 A1* 5/2006 Oh ............................. 55/345

FOREIGN PATENT DOCUMENTS

| | | |
|---|---|---|
| DE | 102004028675 | 6/2004 |
| DE | 102004028677 | 3/2005 |
| DE | 102004028676 | 4/2005 |
| DE | 102004028678 | 4/2005 |
| FR | 2619498 | 2/1989 |
| GB | 2372434 | 8/2002 |
| GB | 2406064 | 3/2005 |
| GB | 2406065 | 3/2005 |
| GB | 2406067 | 3/2005 |
| JP | 52-14775 | 7/1975 |
| JP | 52-14775 | 2/1977 |
| JP | 05-123610 | 5/1993 |
| JP | 05-220424 | 8/1993 |
| KR | 20020028498 | 4/2002 |
| WO | WO02067756 | 9/2002 |

OTHER PUBLICATIONS

Office Action from German Patent Office and English Translation ,Oct. 2006.

* cited by examiner

*Primary Examiner*—Robert A. Hopkins
(74) *Attorney, Agent, or Firm*—Ladas & Parry LLP

(57) ABSTRACT

An improved cyclone dust-collecting apparatus of a vacuum cleaner for efficient collection of fine dusts. The vacuum cleaner which comprises a cyclone body integrally including a first cyclone part and a second cyclone part formed around the first cyclone part, a first cover mounted on the cyclone body and including air paths through which dust-laden air flows, a second cover concentrating and transferring air exhausted from the second cyclone part to the cyclone body, and a dust receptacle mounted under the cyclone body and collecting separated dusts.

15 Claims, 9 Drawing Sheets

CYCLONE DUST-COLLECTING APPARATUS

CROSS-REFERENCE TO RELATED APPLICATIONS

This application claims the benefit under 35 U.S.C. § 119(a) from Korean Patent Application Nos. 2004-9088 filed on February 11 and 2004-88845 filed on Nov. 3, 2004 in the Korean Intellectual Property Office, the disclosure of which is incorporated herein by reference in its entirety.

BACKGROUND OF THE INVENTION

1. Field of the Invention

The present invention is directed to a cyclone dust-collecting apparatus having enhanced fine dust collecting efficiency.

2. Description of the Related Art

A vacuum cleaner, such as an upright-type cleaner and a canister-type cleaner, has a suction brush which is connected to a cleaner body and moves on a surface to be cleaned. An inside of the cleaner body is divided into a dust chamber accommodating a removable dust filter and a motor chamber accommodating a motor which generates a suction force. When the motor is driven, the suction force is generated at the suction brush. The suction force draws in air laden with dusts and contaminants from the cleaning surface into the cleaner body. The drawn air is passed through the dust filter of the dust chamber and discharged outside. The dusts and contaminants in the drawn air are filtered by the dust filter, and the clean air is discharged outside via the motor chamber.

Such a conventional vacuum cleaner as described above needs consumable dust filters for filtering the dusts and contaminants.

When the dust filter is clogged with the dusts and contaminants, the dust filter needs replacement, and the manual replacement of the dirty dust filter is inconvenient and unhygienic to a user.

To address these drawbacks, various cyclone dust-collectors have been developed and prevalent, which have high dust collecting efficiency and are reusable after removing the clogged contaminants. The cyclone dust-collector is constructed to centrifugally separate dusts and contaminants from the drawn air.

However, the cyclone dust-collector has lower efficiency in collecting fine dusts as compared with the conventional vacuum cleaner using a dust bag or the dust filter. Hence, it is demanded to develop a cyclone dust-collector capable of improving user's convenience and dust collecting efficiency especially in collecting the fine dusts.

SUMMARY OF THE INVENTION

To overcome the above drawbacks of the conventional arrangement, an exemplary aspect of the present invention is to provide an improved cyclone dust-collecting apparatus of a vacuum cleaner for efficient collection of fine dusts.

Above aspects and advantages of the present invention are accomplished by providing the vacuum cleaner which comprises a cyclone body integrally including a first cyclone part and a second cyclone part formed around the first cyclone part, a first cover mounted on the cyclone body and including air paths through which dust-laden air flows, a second cover concentrating and transferring air exhausted from the second cyclone part to the cyclone body, and a dust receptacle mounted under the cyclone body and collecting separated dusts.

Advantageously, the air path comprise ducts respectively connected to the second cyclone part, through which the air exhausted from the first cyclone part is flowed into the second cyclone part, and exhaust holes through which the air exhausted from the second cyclone part is discharged into a space sealed by the second cover.

The ducts each comprises a first duct part connected to an outlet of the first cyclone part and a second duct part connected to the first duct part and the second cyclone part.

The ducts each has an upper side of the first duct part which is a rising slope from an outlet of the first cyclone part to the top, and an upper side of the second duct part which is a falling slope from the top to inlets of the second cyclone part.

Advantageously, a curvature of the rising slope is smaller than that of the falling slope.

The ducts are in alternate fashion such that the whirling current moves in opposite directions in the adjoining second cyclone part.

The exhaust holes are projected in a direction of an air flow exhausted from the second cyclone part and each comprises a rib member disposed in a path of the exhausted air.

The rib member comprises a plate bisecting a cross section of each exhaust hole and is longitudinally disposed with respect to the exhaust hole.

A sealing member is interposed between the cyclone body and the first cover for sealing the first and second cyclone parts respectively.

The sealing member seals 20% to 30% of the first duct part and the second duct part surrounding the exhaust holes of the ducts.

The sealing member comprises openings corresponding to the second cyclone part, and the openings partially block of the ducts so that the air enters the second cyclone part in an eccentric direction and forms the whirling current.

The sealing member is guided by a guide member formed at the cyclone body for the fixation.

According to another aspect of the present invention, the first cover may be formed of one of a soft rubber of a PVC, and seal the first and second cyclone parts. A path forming member is interposed between the first cover and the cyclone body to seal a part of the duct.

BRIEF DESCRIPTION OF THE DRAWING FIGURES

These and/or other aspects and advantages of the invention will become apparent and more readily appreciated from the following description of the embodiments, taken in conjunction with the accompanying drawing figures of which:

DETAILED DESCRIPTION OF THE EXEMPLARY EMBODIMENTS

Figure 1:
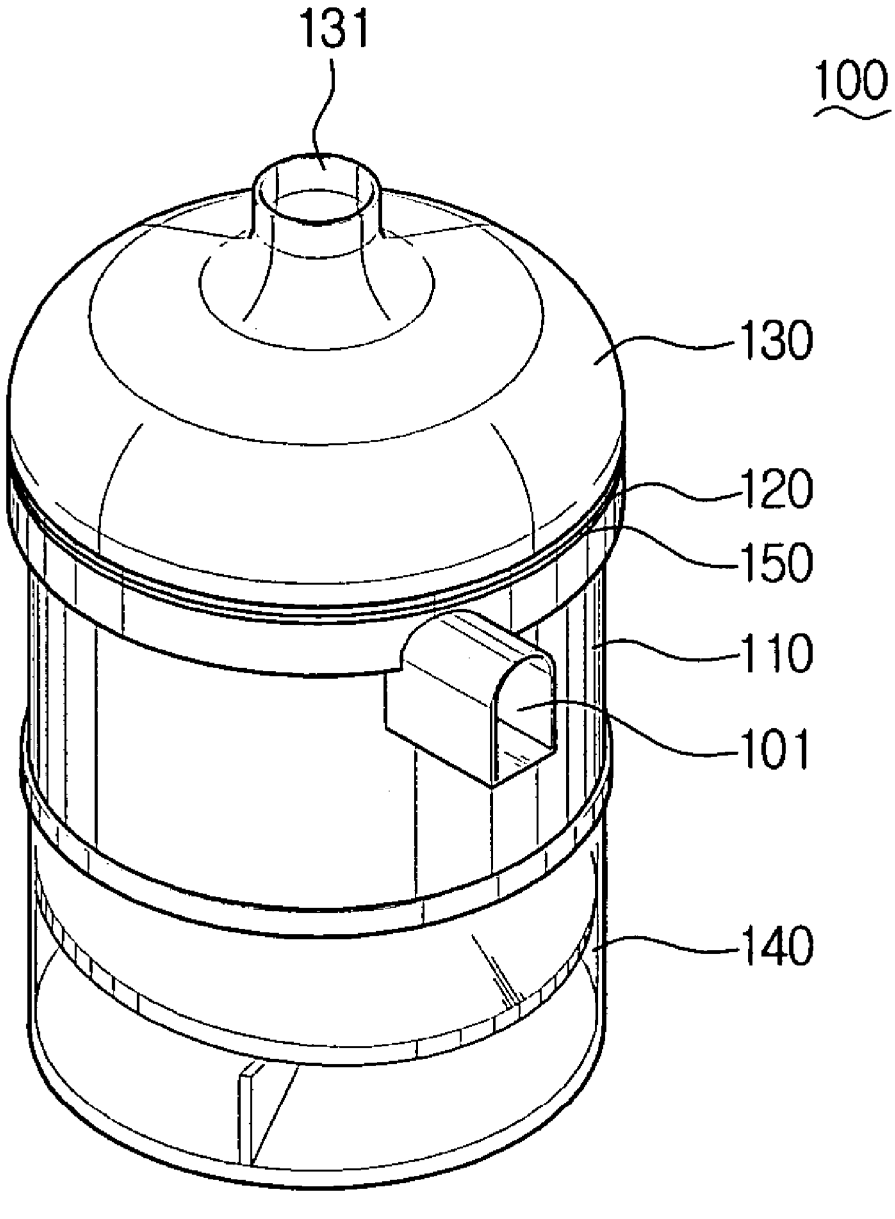
FIG. 1 is a perspective view illustrating a cyclone dust-collecting apparatus according to one embodiment of the present invention.

Reference will now be made in detail to the embodiments of the present invention, examples of which are illustrated in the accompanying drawing figures, wherein like reference numerals refer to the like elements throughout. The embodiments are described below in order to explain the present invention by referring to the drawing figures.

FIG. 1 illustrates an appearance of a cyclone dust-collecting apparatus according to one embodiment of the present invention.

Referring to FIG. 1, the cyclone dust-collecting apparatus 100 includes a cyclone body 110, a first cover 120 and a second cover 130 both being mounted on the cyclone body 110, a dust receptacle 140 removably disposed under the cyclone body 110, and a sealing member 150 interposed between the cyclone body 110 and the first cover 120, for preventing air leakage.

Figure 2:
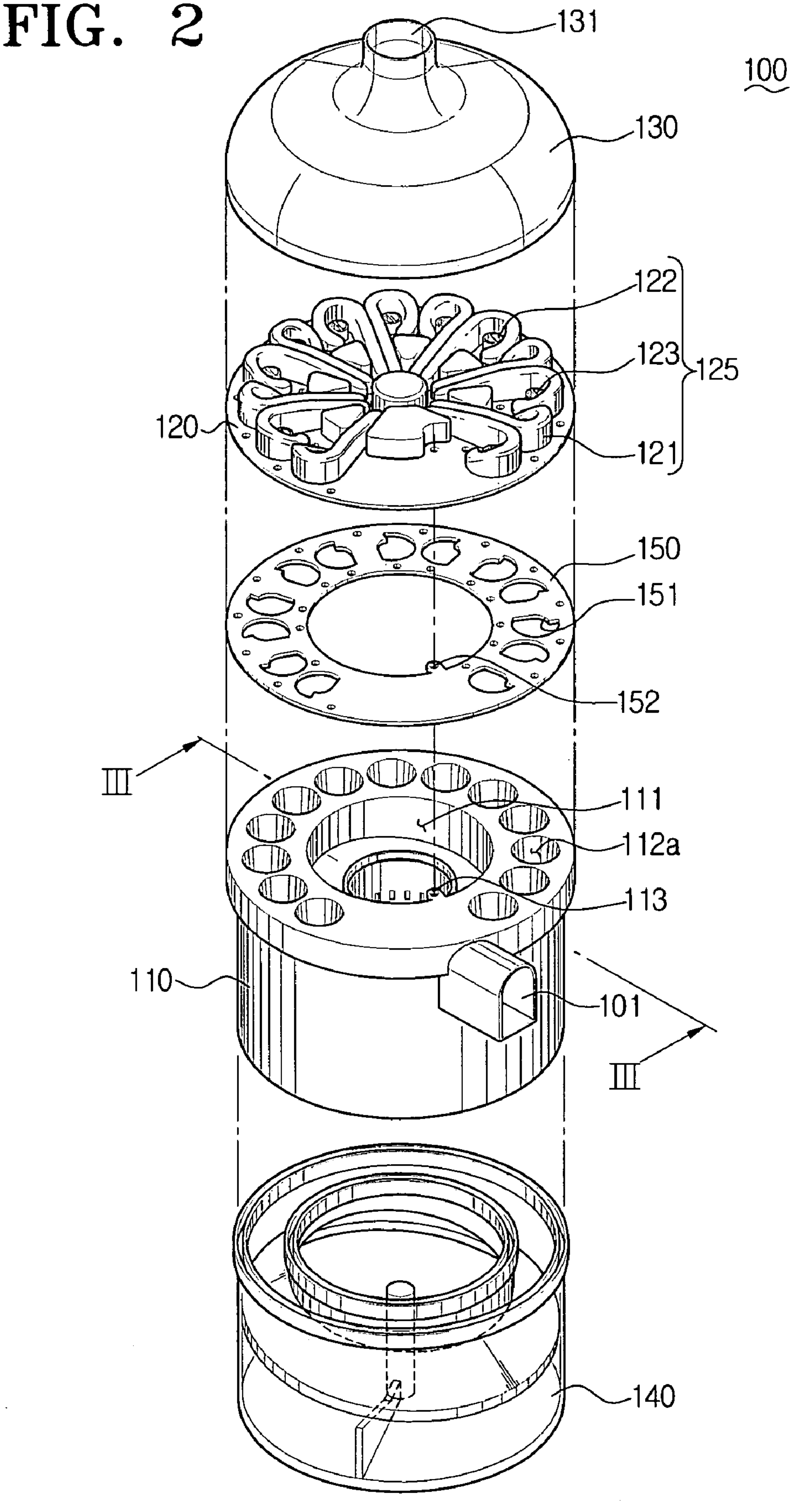
FIG. 2 is an exploded perspective view illustrating the cyclone dust-collecting apparatus according to one embodiment of the present invention.

FIG. 2 is an exploded perspective view illustrating the cyclone dust-collecting apparatus 100 according to one embodiment of the present invention, which is described below in great detail.

The cyclone body 110 includes a first cyclone part 111 in the center of the cyclone body 100, and a second cyclone part 112 formed around the first cyclone part 111. The first and second cyclone parts 111 and 112 may be integrally formed.

The first cyclone part 111 is eccentrically connected with a suction port 101 communicating with a suction brush (not shown). Dust-laden air is drawn through the suction port 101 and descends, forming the whirling current along an inner side of the first cyclone part 111, thus separating by centrifugal force the contaminants from the drawn air. The separated contaminants are collected into the dust receptacle 140.

Figure 3:
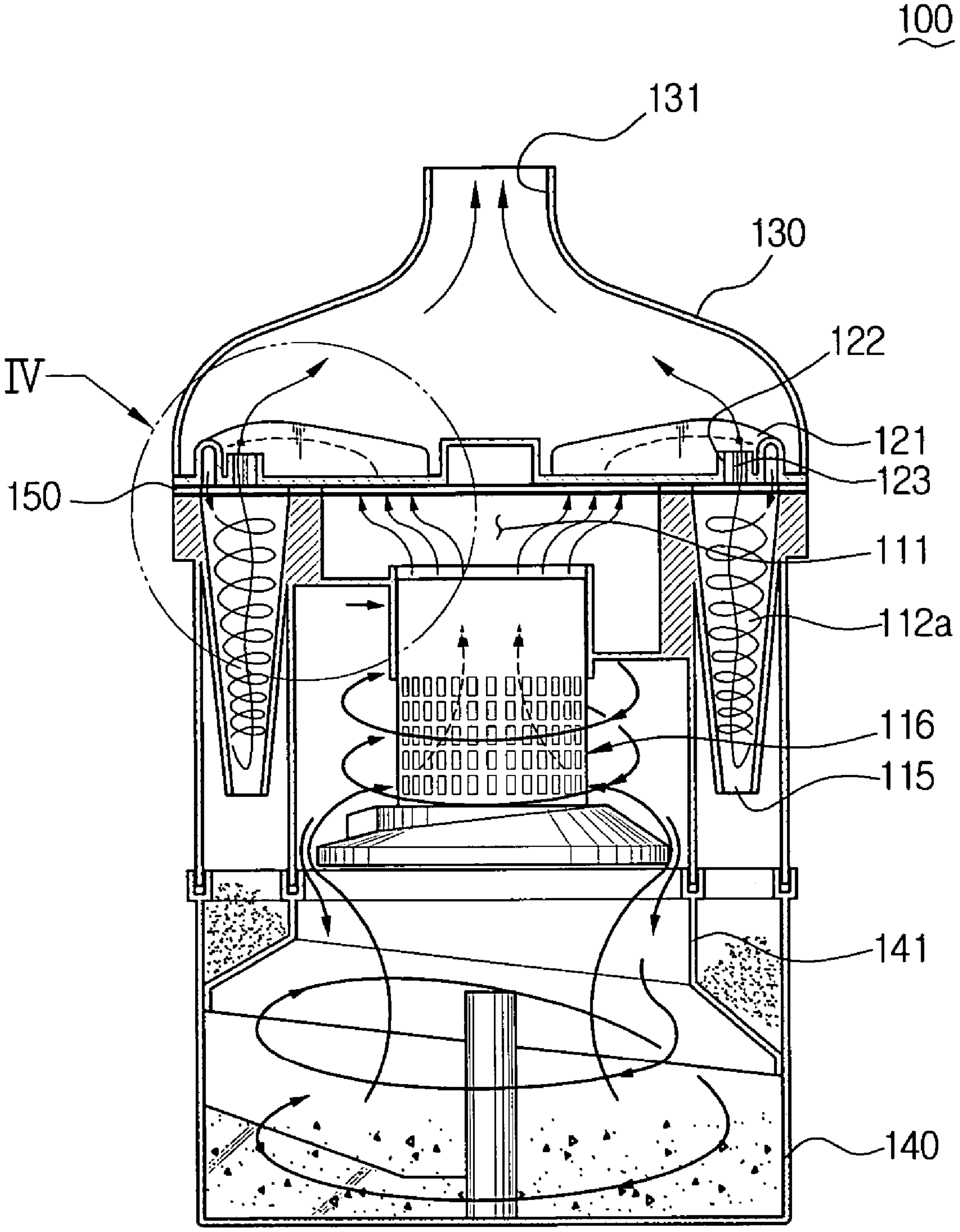
FIG. 3 is a cross-sectional view illustrating the cyclone dust-collecting apparatus taken along the line III-III of FIG. 2.

The center of the first cyclone part 111 is penetrated, in which a grill member 116 is removably fit as shown in FIG. 3. The grill member 116 blocks the separated contaminants from backflow. The clean air passes through the grill member 116 and ascends to the first cyclone part 111.

The air passes through the grill member 116, and enters into the second cyclone part 112 along air paths 125 formed on the first cover 120.

The second cyclone part 112 comprises second cyclone bodies 112*a* formed on a top surface of the first cyclone part 111 substantially in a letter 'C' arrangement, and through holes 115 at the lower ends of the second cyclone bodies 112*a*.

Advantageously, the second cyclone bodies 112 are each configured as a cone of which the top side is greater than the bottom side in diameter as shown in FIG. 3. The through holes 115 lead into the dust receptacle 140 so that fine dusts secondly separated in the second cyclone bodies 112*a* are collected into the dust receptacle 140 therethrough.

The first cover 120 is mounted on the cyclone body 100. The air paths 125 each are positioned corresponding to the second cyclone bodies 112*a* and lead the air exhausted from the first cyclone part 111 into the second cyclone part 112.

The air paths 125 include ducts 121 and exhaust holes 122.

Figure 4:
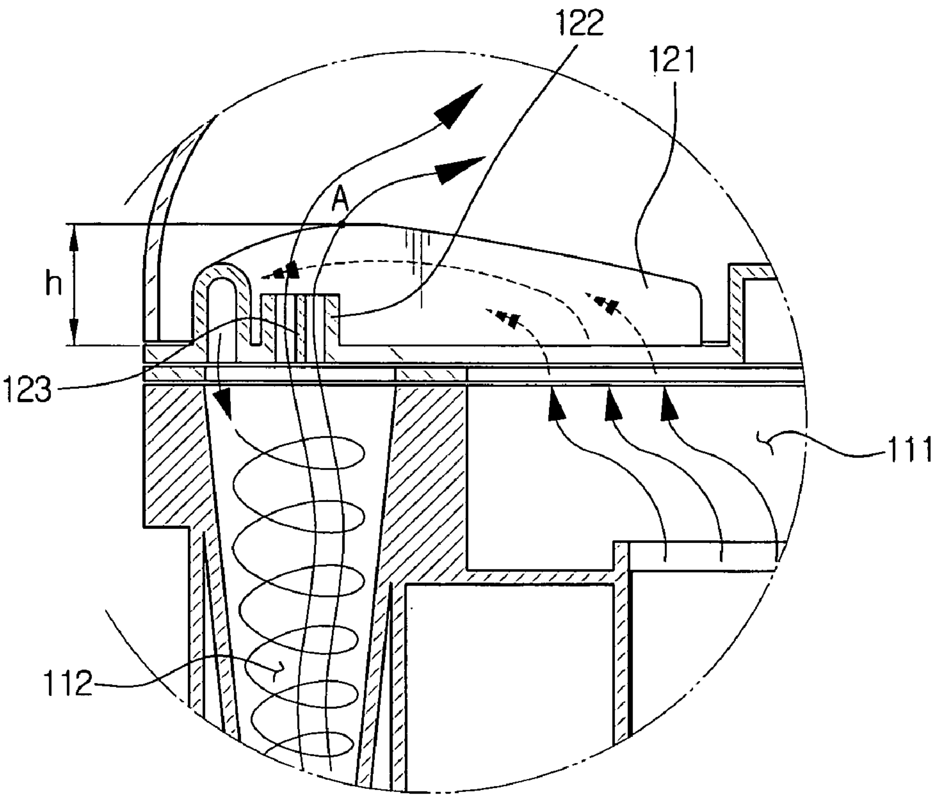
FIG. 4 is an enlarged cross-sectional view illustrating the encircled area IV of FIG. 3.
Figure 5:
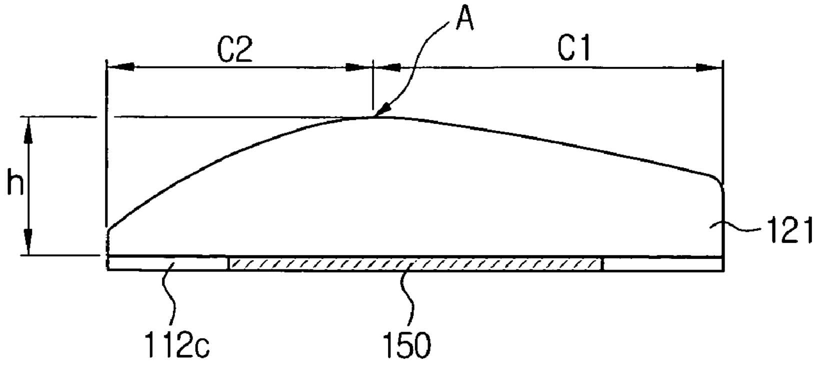
FIG. 5 is a view illustrating a duct of the cyclone dust-collecting apparatus according to one embodiment of the present invention.

The ducts 121 conduct the air exhausted from the first cyclone part 111 into the second cyclone bodies 112*a* Referring to FIGS. 3 through 5, it is preferable that an upper side of each duct 121 is rounded so as to reduce friction with the air discharged from the first cyclone part 111. Referring to FIGS. 4 and 5, the highest point at the height h will be called a top A. The upper side of each duct 121 has a rising slope C1 extended from a part connected to an outlet of the first cyclone part 111 to the top A and a falling slope C2 extended from the top A to a part connected to the second cyclone part 112 and forming inlets 112*c* of the second cyclone part 112. With this construction, the airflow from the first cyclone part 111 to the second cyclone part 112 is prevented from abruptly changing its direction and the friction between the inside of the ducts 121 and the discharged air decreases.

The air enters into the ducts 121, and rotates along the inner side of the second cyclone bodies 112*a*, forming the whirling current so as to separate by a centrifugal force fine dusts which are unfiltered in the first cyclone part 111. The clean air in the second cyclone part 112 is discharged to the upper part of the first cover 120 via the exhaust holes 122. The shape of the ducts 121 will be described below in more detail.

The secondly separated air in the second cyclone bodies 112*a* is exhausted through the exhaust holes 122 into a hollow space formed between the first cover 120 and the second cover 130. Referring to FIGS. 3 and 4, each of the exhaust holes 122 is preferably provided with a rib member 123 which is longitudinally disposed with respect to the air exhaust path from the exhaust holes 122. The rib member 123 may be a plate bisecting a cross section of the exhaust hole 122. The presence of the rib member 123 prevents air turbulence and therefore, minimizes dust collecting efficiency loss due to the turbulence of the exhausted air.

The construction and the shape of the ducts 121 and the exhaust holes 122 will be described below in greater detail.

Referring to FIGS. 2 and 3, the clean air exhausted from the exhaust holes 122 builds up in the second cover 130 mounted on the first cover 120, and flows to a motor chamber (not shown) through a connection hole 131 which is disposed at a top side of the second cover 130. Advantageously, an inner side of the second cover 130 is curved gently so as to reduce the friction between the air exhausted from the exhaust holes 122 and the inner side of the second cover 130.

The dust receptacle 140 is removably disposed under the cyclone body 110, and is partitioned by a partition 141 into a large-dust receptacle and a fine-dust receptacle. The partition 141 allows the first and second cyclone parts 111 and 112, to fluidly communicate with the first cover 120 only. The dust receptacle 140 may be formed with a transparent material for the observation by a user.

The construction and the shape of the ducts 121 and the exhaust holes 122 are described in greater detail.

Figure 6:
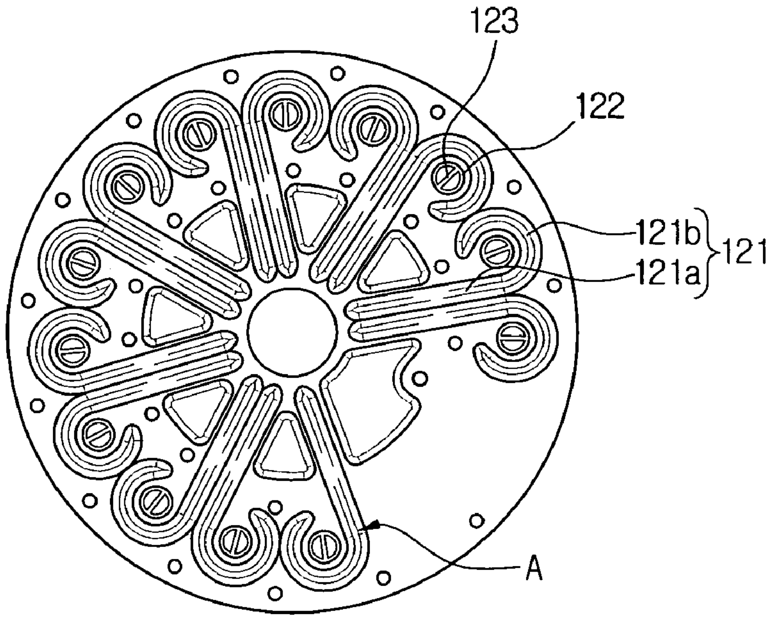
FIG. 6 is a top view illustrating a first cover according to one embodiment of the present invention.

FIG. 6 is a top view of the first cover 120.

The ducts 121 each includes a first duct part 121*a* of a predetermined length and a second duct part 121*b* formed after the top A. The duct 121 is integrally formed with the first cover 120 with the second duct part 121*b* thereof surrounding the exhaust hole 122. The ducts 121 are arranged around the exhaust holes 122 in alternate fashion so that air can enter in opposite directions. That is, one second duct part 121*b* faces a certain direction and the adjacent one faces the opposite direction and so on. Thus, after passing through the second cyclone part 112, the air from the exhaust holes 122 is prevented from building up into the turbulence in the second cover 130.

According to one embodiment of the present invention, the first duct parts 121*a* adjoin with the first duct parts 121*a* of the neighboring ducts 121 in either side. Hence, the air path in the first duct parts 121*a* is simplified, the molding of the ducts 121 is facilitated, and the manufacture cost is reduced.

The second duct parts 121*b* are formed to induce the whirling current from the air entering through the second cyclone part 112. A curvature of the second duct parts 121*a* corresponds to that of the top side of the second cyclone part 112.

According to the embodiment of the present invention, a duct 121 paired with an exhaust hole 122 is connected with each of the second cyclone bodies 112*a*.

Referring back to FIG. 2, the sealing member 150 is interposed between the first cover 120 and the cyclone body 110 for preventing air leakage.

Figure 7:
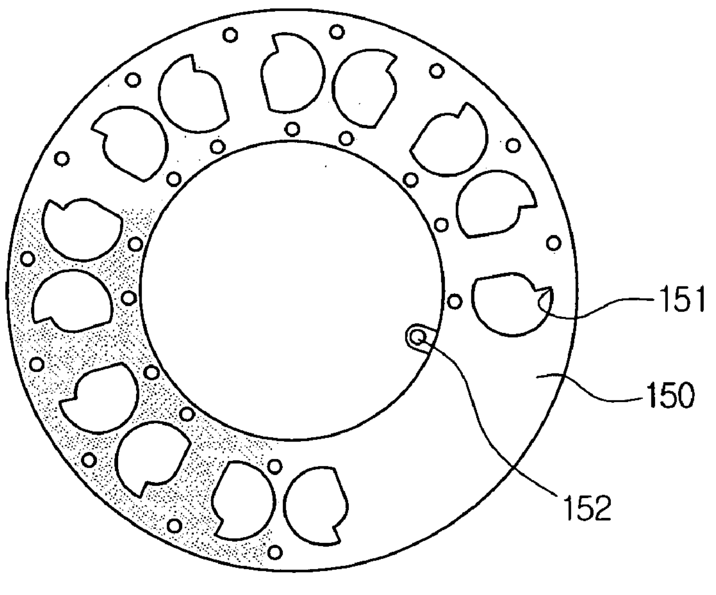
FIG. 7 is a top view illustrating a sealing member according to one embodiment of the present invention.
Figure 8:
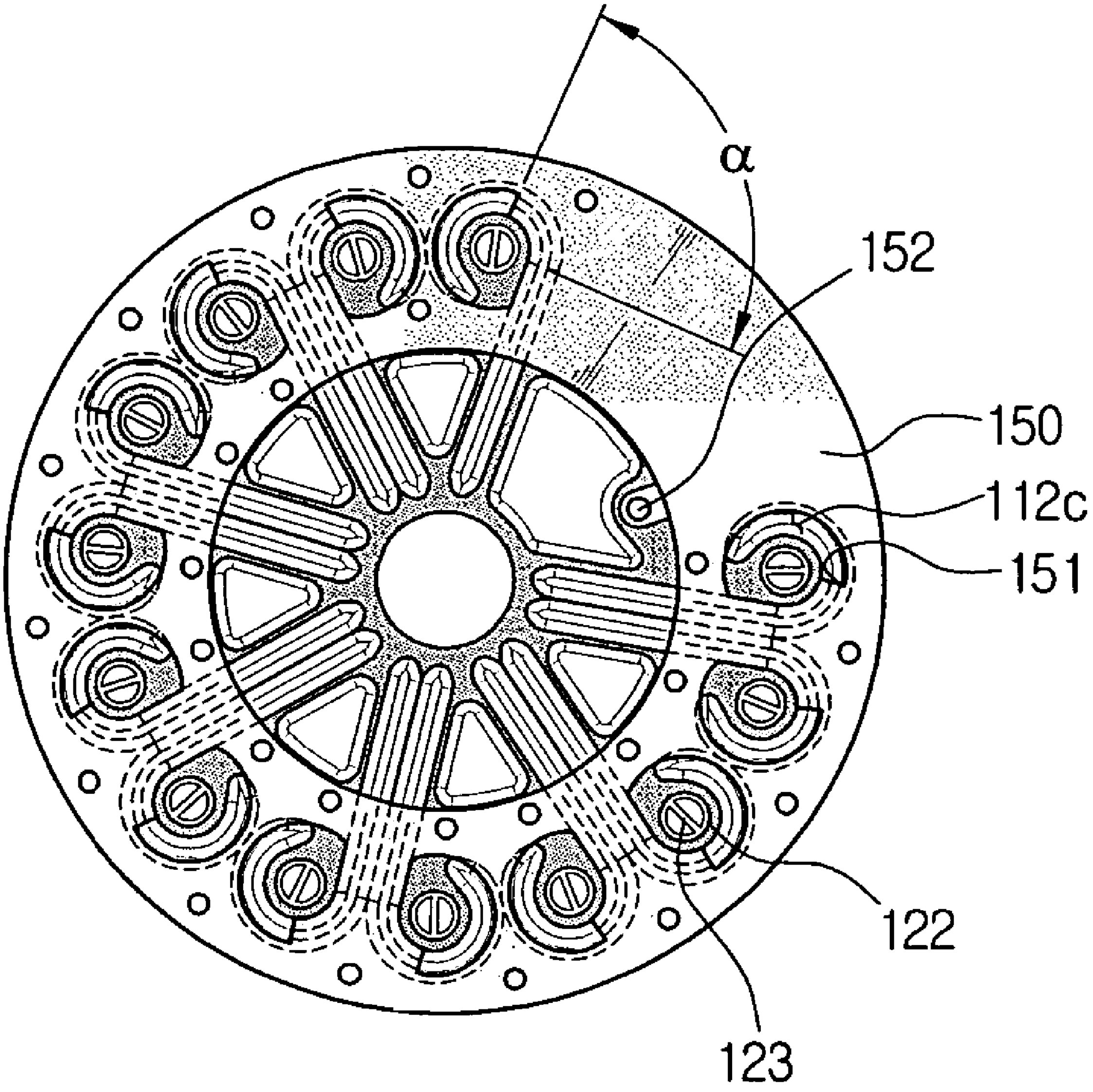
FIG. 8 is a bottom view illustrating the ducts exposed when the first cover and the sealing member fit together according to one embodiment of the present invention.

Referring now to FIG. 7, the sealing member 150 includes openings 151 at a position corresponding to the second cyclone bodies 112*a*. The openings 151 are configured such that they can partially seal the ducts 121. A part of each opening 151 is formed to correspond to the curvature of the counterpart second duct part 121*b*, while the rest portion is formed to partially seal the first and second duct parts 121*a* and 121*b* from the counterpart second cyclone part 112. Referring to FIG. 8, the cross section of inlets 112*c* of the second cyclone part 112 is adjusted by sealing an area from the top A to an inner angle of α. Accordingly, the flowrate of the whirling current into the second cyclone part 112 is controlled, and the centrifugal separation in the second cyclone part 112 is effectively performed with an optimal speed of the whirling current.

According to one embodiment of the present invention, the openings 151 is shaped and constructed in a manner that the sealing member 150 seals the area from the top A, from which the second duct parts 121*b* is formed, to the inner angle of 90°.

The sealing member 150 seals the first duct parts 121*a* and the second cyclone part 112, as well as the second duct parts 121*b* from the top A to the inner angle of 90° so that the first cyclone part 111 fluidly communicates with the second cyclone part 112 only through the predetermined area and the inlets 112*c* of the second cyclone part 112.

The air from the ducts 121 passes through the second duct parts 121*b*, and enters the second cyclone part 112 through the inlets 112*c*, to thus effectively creating the whirling current in the second cyclone part 112.

Since the inlets 112*a* of the second cyclone part 112 are formed at the end of the second duct parts 121*b*, the turbulence of the whiling current is prevented and the dusts separation by the centrifugal force in the second cyclone parts 112 is facilitated.

The sealing member 150 is provided with a fixed projection 152 corresponding to a guide part 113 (FIG. 2) of the cyclone body 110 to guide and facilitate the fixation of the sealing member 150 and the cyclone body 110.

An operation of the cyclone dust-collecting apparatus 100 is described below according to one embodiment of the present invention.

Referring back to FIG. 3, the dust collecting operation of the cyclone dust-collecting apparatus 100 is illustrated.

When the dust-laden air is drawn from the suction brush (not shown) through the suction port 101 (FIG. 2) which is eccentrically connected to the first cyclone part 111, the drawn air descends into the dust receptacle 140 while rotating along the inner side of the first cyclone part 111. The dusts are separated from the drawn air by the centrifugal force in the second cyclone part 111, and the large dusts among the separated dusts are dropped onto the bottom of the dust receptacle 140.

The firstly cleaned air ascends from the bottom of the dust receptacle 140, flows into the top side of the first cyclone part 111 via the grill member 116, collides against the first cover 120, and disperses and enters into the ducts 121 of the first cover 120.

After hitting against the first cover 120 and dispersing into the ducts 121, the firstly cleaned air flows toward the second cyclone part 112 and forms the second whirling current. Specifically, since the ducts 121 is eccentrically connected to the top side of the second cyclone part 112, the firstly cleaned air descends while rotating along the inner side of the second cyclone part 112 as shown in FIGS. 3 and 4.

The fine dusts which are unseparated in the first cyclone part 111, are separated by the centrifugal force and fall down into the dust receptacle 140 through the through holes 115. The clean air ascends from the lower part of the second cyclone part 112, and enters the second cover 130 through the exhaust holes 122.

The air from the exhaust holes 122 builds up in the second cover 130, flows to the motor chamber (not shown) through the connection hole 131 disposed at the top side of the second cover 130, and is discharged outside.

As compared with the conventional vacuum cleaner, the firstly cleaned air in the first cyclone part 111 is secondly cleaned in the second cyclone part 112 formed around the first cyclone part 111. Hence, even the fine dusts unseparated in the first cyclone part 111 can be surely separated in the second cyclone part 112.

Figure 9:
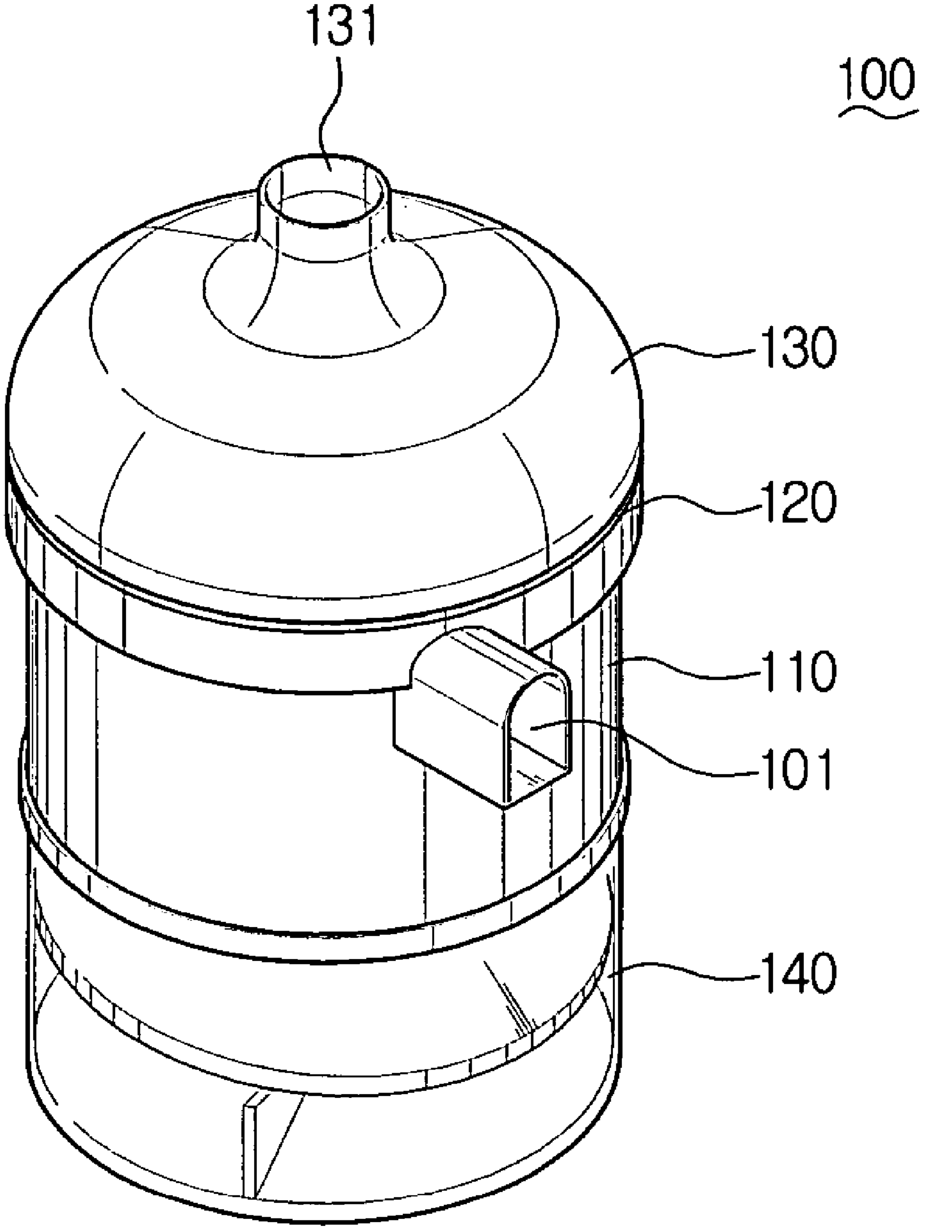
FIG. 9 is a perspective view illustrating a cyclone dust-collecting apparatus.
Figure 10:
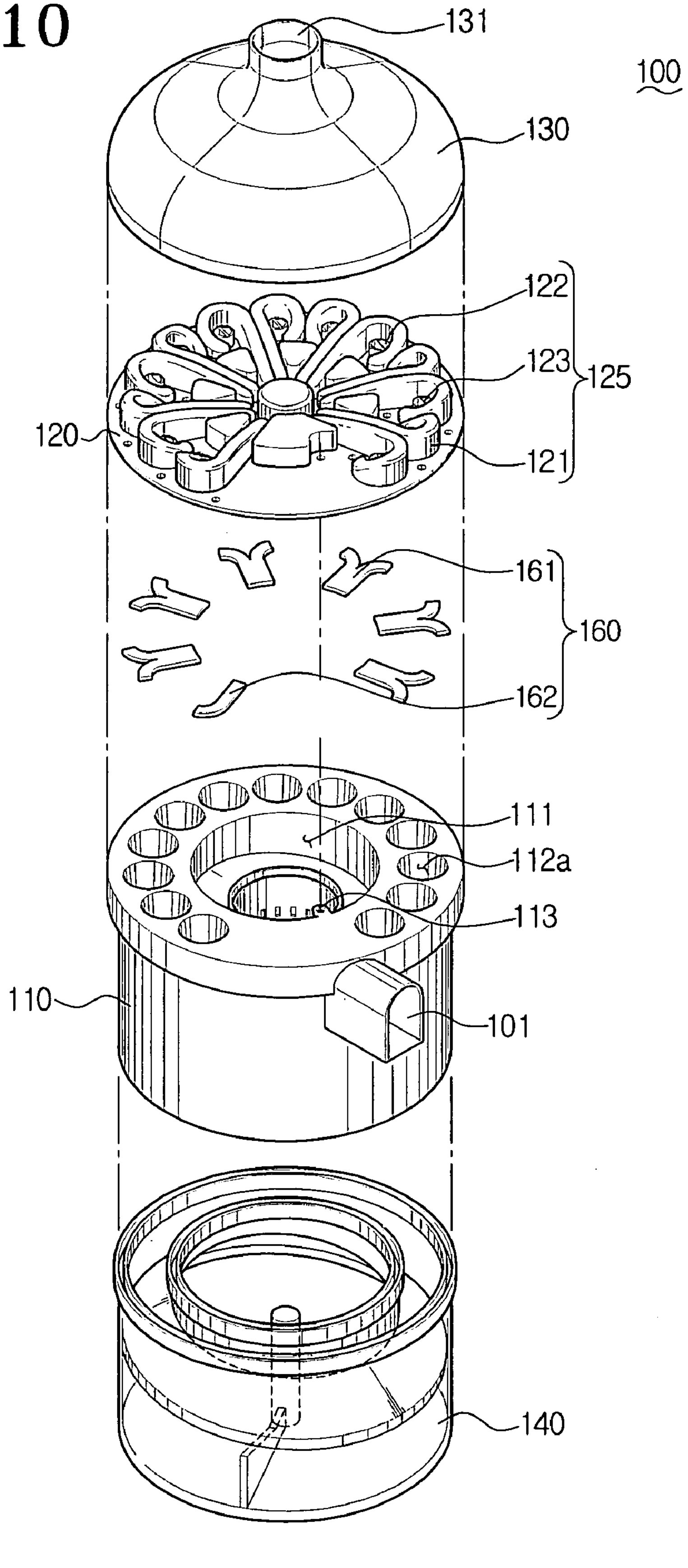
FIG. 10 is an exploded perspective view of FIG. 9.
Figure 11:
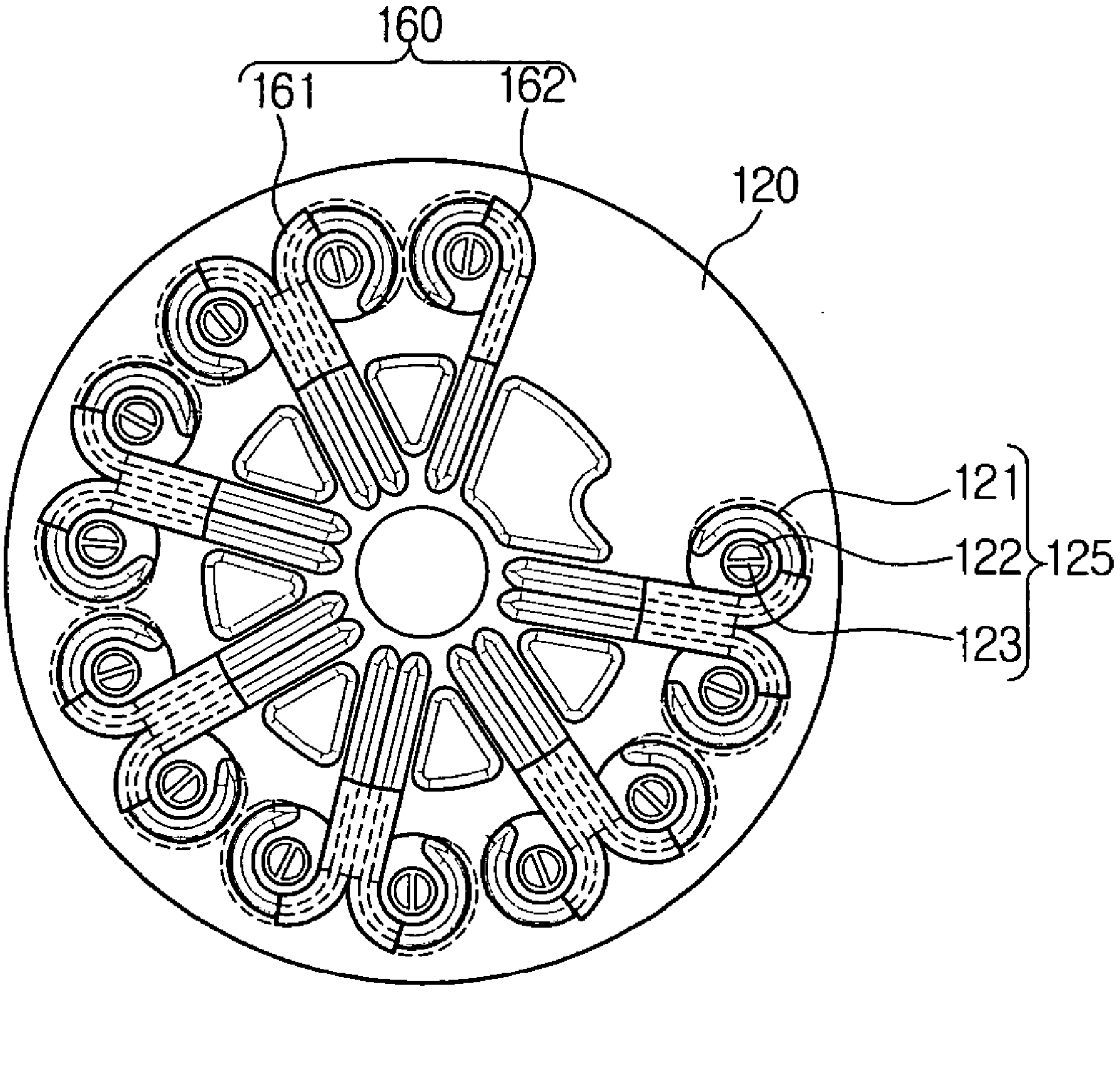
FIG. 11 is a view illustrating the ducts exposed when the first cover and the sealing member fit together according to another embodiment of the present invention.

According to another embodiment of the present invention, a first cover 120 may be formed of a soft rubber or a PVC, and may be mounted on a cyclone body 110 without having to employing a sealing member 150, as shown in FIGS. 9 through 11.

A path forming member 160 sealing a part of a duct 121 is interposed between a cyclone body 110 and a first cover 120 to form an inlet of a second cyclone part 112, as shown in FIGS. 10 and 11.

The path forming member is shaped in a form of a character "Y", and includes a first path forming member 161 and a second path forming member 162. The first path forming member 161 seals parts of two adjacent ducts 121 at the same time, and the second path forming member 162 seals a single duct 121. The path forming member 160 is bonded under the first cover 120 on a surface facing the cyclone body 110, and forms the inlet 112 (FIG. 8) of the second cyclone part 112. Owing to the presence of the path forming member 160, air entering through the inlet 112*c* of the second cyclone part 112 can obtain a speed enough to form a whirling current in a second cyclone body 112*a*.

According to another embodiment of the present invention, the first cover 120 is able to prevent air leakage between the cyclone body 110 and the first cover 120, and thus, the sealing member 150 in one embodiment of the present invention can be omitted. Advantageously, the material of the first cover 120 is one of a rubber or a PVC, but not limited to these materials. It is possible to apply and deform any material providing sealing effect.

In the light of the foregoing, the large dusts are separated in the first cyclone part 111 and the fine dusts are separated in the second cyclone part 112, thus enhancing the dust collecting efficiency.

Since the air exhausted from the first cyclone part 111 flows into the second cyclone part 112 along the curved path in the eccentric direction, the friction due to the abrupt change of the current direction is prevented and the suction efficiency does not deteriorates.

If the first cover 120 is formed of a rubber material, the number of the part and the manufacturing cost reduce owing to the absence of an additional sealing member.

While the embodiments of the present invention have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the invention.

What is claimed is:

1. A cyclone dust collecting apparatus comprising:

a cyclone body integrally including a first cyclone part and a second cyclone part formed around the first cyclone part;

a first cover mounted on the cyclone body and including air paths through which dust-laden air flows the air paths comprising ducts and exhaust holes, the ducts being connected to the second cyclone part, through which the air exhausted from the first cyclone part flows into the second cyclone part; each of the ducts having:

a first duct part connected to an outlet of the first cyclone part;

a second duct part connected to the first duct part and the second cyclone part; and a top formed between the first duct part and the second duct part, the first and second duct parts sloping from the top to opposite directions, the exhaust holes allowing air exhausted from the second cyclone part to be discharged into a space sealed by the second cover, the ducts being disposed to substantially surround the exhaust holes;

a second cover concentrating and transferring air exhausted from the second cyclone part to the cyclone body; and a dust receptacle mounted under the cyclone body and collecting separated dusts.

2. The cyclone dust collecting apparatus of claim 1, wherein the ducts each has an upper side of the first duct part which is a rising slope from an outlet of the first cyclone part to the top, and an upper side of the second duct part which is a falling slope from the top to inlets of the second cyclone part.

3. The cyclone dust collecting apparatus of claim 2, wherein a curvature of the rising slope is smaller than that of the falling slope.

4. The cyclone dust collecting apparatus of claim 1, wherein the ducts are sized, shaped and arranged such air flowing through them forms a whirling current, which in a direction that is opposite to the direction of the air flowing in an adjoining second cyclone part.

5. The cyclone dust collecting apparatus of claim 1, wherein the exhaust holes are projected in a direction of an air flow exhausted from the second cyclone part.

6. The cyclone dust collecting apparatus of claim 1, wherein the exhaust holes each comprises a rib member disposed in a path of the exhausted air.

7. The cyclone dust collecting apparatus of claim 6, wherein the rib member comprises a plate bisecting a cross section of each exhaust hole and is longitudinally disposed with respect to the exhaust hole.

8. The cyclone dust collecting apparatus of claim 1, further comprising a sealing member interposed between the cyclone body and the first cover for sealing the first and second cyclone parts respectively.

9. The cyclone dust collecting apparatus of claim 8, wherein the sealing member comprises openings corresponding to the second cyclone part, and the openings partially block of the ducts so that the air enters the second cyclone part in an eccentric direction and forms the whirling current.

10. The cyclone dust collecting apparatus of claim 8, wherein the sealing member is guided by a guide member formed at the cyclone body for the fixation.

11. The cyclone dust collecting apparatus of claim 1, wherein the first cover is formed of a soft material to seal the first and second cyclone parts.

12. The cyclone dust collecting apparatus of claim 11, wherein the first cover is formed of one of a rubber and a PVC (polyvinyl chloride duct).

13. The cyclone dust collecting apparatus of claim 1, wherein the first cover further comprises a path forming member sealing a part of the duct.

14. A cyclone dust collecting apparatus comprising:

a cyclone body integrally including a first cyclone part and a second cyclone part formed around the first cyclone part;

a first cover mounted on the cyclone body and including air paths through which dust-laden air flows, the air paths comprising ducts and exhaust holes, the ducts being connected to the second cyclone part, through which the air exhausted from the first cyclone part flows into the second cyclone part; each of the ducts having:

a first duct part connected to an outlet of the first cyclone part;

a second duct part connected to the first duct part and the second cyclone part; and a top formed between the first duct part and the second duct part, the first and second duct parts sloping from the top to opposite directions, the exhaust holes allowing air exhausted from the second cyclone part to be discharged into a space sealed by the second cover, the ducts being disposed to substantially surround the exhaust holes;

a second cover concentrating and transferring air exhausted from the second cyclone part to the cyclone body;

a sealing member interposed between the cyclone body and the first cover, having a predetermined shape corresponding to the second cyclone part, and comprising openings for partially sealing a cross section of inlets of the second cyclone part; and a dust receptacle mounted under the cyclone body and collecting separated dusts.

15. The cyclone dust collecting apparatus of claim 14, wherein the sealing member seals a part of the first duct part and an area between 80° and 100° from the top of the second duct part surrounding the exhaust holes of the ducts.

* * * * *